United States Patent [19]

Hashimoto et al.

[11] Patent Number: 5,008,053
[45] Date of Patent: Apr. 16, 1991

[54] PROCESS FOR PRODUCING A CERAMIC PRODUCT USING SLUDGE ASHES

[75] Inventors: Ryusuke Hashimoto, Fuso; Mitsuru Iwata; Junichi Sugihara, both of Mitake; Minoru Iwase, Mitake, all of Japan

[73] Assignee: Fujimi Ceramic Co., Ltd., Nagoya, Japan

[21] Appl. No.: 418,141

[22] Filed: Oct. 6, 1989

Related U.S. Application Data

[63] Continuation-in-part of Ser. No. 71,273, Jun. 9, 1987, Pat. No. 4,874,153.

[30] Foreign Application Priority Data

Aug. 8, 1989 [JP] Japan .................. 1-205104

[51] Int. Cl.$^5$ .............................................. C04B 35/64
[52] U.S. Cl. ........................................ 264/60; 264/56; 264/63; 501/155
[58] Field of Search .......................... 264/56, 63, 60; 501/155

[56] References Cited

U.S. PATENT DOCUMENTS

| | | | |
|---|---|---|---|
| 338,465 | 3/1886 | Bayer et al. | 264/DIG. 39 |
| 395,590 | 1/1889 | Suttler | 264/DIG. 39 |
| 1,569,251 | 1/1926 | Austin | 264/DIG. 39 |
| 2,949,704 | 8/1960 | Jacobs | 264/60 |
| 4,112,033 | 9/1978 | Lingl et al. | 264/56 |
| 4,370,285 | 1/1983 | Plück | 264/65 |
| 4,874,153 | 10/1989 | Hashimoto et al. | 264/56 |

FOREIGN PATENT DOCUMENTS

| | | |
|---|---|---|
| 4747472 | 4/1969 | Japan . |
| 49-107970 | 2/1973 | Japan . |
| 5117206 | 8/1974 | Japan . |
| 58-161965 | 2/1982 | Japan . |

OTHER PUBLICATIONS

Baba et al., Technology for Producing Aggregate of Sludge Ash Through a Sintering Process in a Sinter--band Furnace (Report of the 21st Lecture Meeting for the Study of Sewage).

News Article, Chunichi Shimbun, Jan. 10, 1986.

*Primary Examiner*—James Derrington
*Attorney, Agent, or Firm*—Lahive & Cockfield

[57] ABSTRACT

A process for producing a ceramic product using sludge ashes comprises the steps of (i) mixing at least ashes obtained by burning a sludge which has been obtained by the treatment of sewage and a plastic ceramic raw material to prepare a first body, (ii) mixing at least a plastic ceramic raw material and a fusible material to prepare a second body, (iii) supplying the first and second bodies into a matrix of a molding machine such that the first and second bodies form a lower, larger layer and an upper, smaller layer which covers the lower layer, respectively, (iv) molding the whole of the first and second bodies into an object with a desired shape, and (v) firing the molding to produce a two-layer ceramic product.

2 Claims, 1 Drawing Sheet

PROCESS FOR PRODUCING A CERAMIC PRODUCT USING SLUDGE ASHES

REFERENCE TO RELATED APPLICATION

The present application is a continuation in part of U.S. patent application Ser. No. 071,273 filed June 9, 1987, now U.S. Pat. No. 4,874,153.

FIELD OF THE INVENTION

This invention relates to a process for producing a ceramic product using ashes obtained by burning sludge.

BACKGROUND OF THE INVENTION

Although sludge, or a sediment deposited during the treatment of sewage, is sometimes used as a compost, its most frequent use is for land reclamation. Since sludge contains heavy metals and emits an offensive odor and may be decomposed, especially in large cities it is burned and the sludge ashes are used for land reclamation. In addition, recently the sludge ashes came to be used as one of the materials of an earthen pipe or of a tile or as lightweight aggregate.

However, the physical properties of the sludge ashes as used in a ceramic product largely depend upon several factors, including the season when the ceramic product is produced and the method by which the sewage was treated. The sludge ashes thus may more or less determine the qualities of the ceramic product, especially its color, mechanical strength and dimensions. Therefore, for example, to produce ceramic products with substantially the same qualities using ashes obtained by burning sludges which have been obtained by different methods of sewage treatment, suitable materials must be added to the ashes in advance so that the ashes will have substantially the same physical properties when the ashes are in the ceramic products. It takes much time and trouble. Also, a ceramic product containing sludge ashes has not met needs for a wide variety of product colors since $Fe_2O_3$ contained in the sludge ashes only gives the product a red brown color or a blackish brown color.

SUMMARY OF THE INVENTION

It is the object of the invention to provide a process for producing a ceramic product using sludge ashes wherein the foregoing drawbacks of the prior art are largely mitigated.

According to the invention, at least sludge ashes and a plastic ceramic raw material are mixed together to prepare a first body for a ceramic product to be produced. Also, at least a plastic ceramic raw material and a fusible material are mixed together to prepare a second body for the ceramic product. The second body is prepared in a smaller amount than the first body. Then, the first and second bodies are molded such that the first body forms a lower, larger layer of the ceramic product while the second body forms an upper, smaller layer thereof. Then, the molding is fired to produce the final product.

The product has a light, whitish color on its surface. However, pigment may be used as an additional ingredient of the second body to create a desired color on the product surface.

When the molding is fired, the upper layer expands in substantially the same manner as the lower layer. Also, after the molding has been fired, the upper layer shrinks in substantially the same manner as the lower layer. Therefore, the product as a whole is free of curvature, nor is there a possibility that the upper layer of the product may be separated from the lower layer thereof.

DETAILED DESCRIPTION OF A PREFERRED EMBODIMENT

Figure 1:
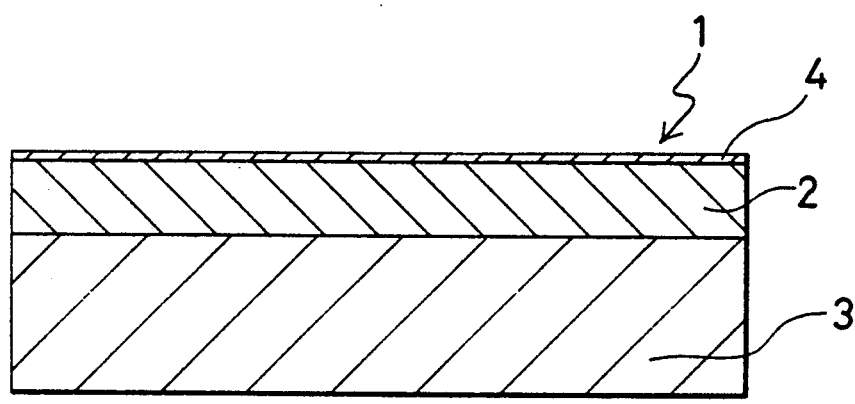
FIG. 1 depicts a ceramic product produced using sludge ashes according to the invention.

A detailed description will now be given of a process for producing a ceramic product using sludge ashes which embodies the invention in a preferred form.

First, ashes obtained by burning a dehydrated sludge are provided. Then, the ashes are mixed with a plastic ceramic raw material. If desired, powdery aggregate may be additionally mixed together. The mixture thus obtained will be called a "first body".

Also, a plastic ceramic raw material and a fusible material are mixed together. If desired, pigment, powdery aggregate and/or sludge ashes may be additionally mixed together. The mixture thus obtained will be called a "second body".

Gairome clay may be used as the plastic ceramic raw materials for the first and second bodies.

The plastic ceramic raw materials for the first and second bodies must be those which do not change their shapes when a molding consisting of the first and second bodies is fired under conditions hereinafter described. For example, fine powders of water-granulated aggregate, of river sand and of dust of wall tiles may be used as the plastic ceramic raw materials.

A material which entirely or partly fuses under the firing conditions hereafter described may be used as the foregoing fusible material. For example, feldspar and a sewage sludge discharged from a factory, especially that discharged from a tile-walls manufacturing factory and containing a great amount of glaze, may be used as the fusible material.

For either of the first and second bodies, the foregoing components may be mixed together either in a wet process or in a dry process.

The wet mixing process includes grinding the components in a ball mill while adding water to the components, so that a slurry with a concentration of 50% to 60% is obtained. Then, the slurry is dehydrated with a filter press. A body cake is thus obtained. Then, the body cake is allowed to dry until the moisture content of the body cake is reduced to a suitable percentage for a molding operation. Then, the body cake is reduced to powder. If desired, a very fine powdery material or powdery aggregate may be added to the foregoing slurry or to the foregoing body cake. Also, if desired, the foregoing slurry may be dried with a spray dryer instead of being dehydrated with a filter press. The wet mixing process preferably should be employed if it is desired to produce a relatively compact ceramic product, or a ceramic product with a relatively great mechanical strength.

The dry mixing process includes drying the components entirely or partly before mixing the components together. After the components have been mixed, water is added to the mixture such that the mixture has a suitable moisture content as a body for a ceramic product. Then, the mixture or body is kneaded and granulated. Then, the body is allowed to dry until the body has a suitable moisture content for a molding operation. The dry mixing process preferably should be employed if it is desired to produce a porous, or water-permeable ceramic product.

After the first and second bodies have been prepared, the first body is first supplied into a mold and then the second body is supplied into the mold in a smaller amount than the first body. Thus, in the mold the first body forms a lower, larger layer of a ceramic product to be produced while the second body forms an upper, smaller layer thereof which covers the lower layer. Then, the whole material in the mold is molded under a suitable pressure into a predetermine shape.

If desired, the molding thus obtained may be coated with glaze on its surface. Finally, the molding is fired in a furnace. Thus, a ceramic product with the upper layer 2 and the lower layer 3 and with properties similar to the properties of porcelain, stoneware or chinaware is produced (FIG. 1). Reference numeral 4 designates the glaze. The ceramic product may be employed as a road paving material, for example.

If the upper layer does not contain a pigment, the product has a light, whitish color on its surface. However, if a pigment with a desired color is used as one of the components of the upper layer, the product has the desired color on its surface.

When the molding is fired, the upper layer expands in substantially the same manner as the lower layer. Also, after the molding has been fired, the upper layer shrinks in substantially the same manner as the lower layer. Therefore, the product as a whole is free of curvature, nor is there a possibility that the upper layer of the product may be separated from the lower layer thereof.

According to the invention, since a ceramic product with an upper layer containing a plastic ceramic raw material and a fusible material, it is possible to produce ceramic products with much the same physical properties using sludge ashes, irrespective of the seasons when the ceramic products are produced and the methods by which the sewages were treated.

Also, according to the invention, if it is desired to give a desired color to the surface of a ceramic product, it is sufficient to use pigment with the desired color only for the upper layer of the product. Also, according to the invention, if, for example, it is desired to produce a ceramic product for use as a road paving material, it is not necessary to give a lower layer so high a mechanical strength as that of an upper layer. Therefore, in such a case, more latitude is allowed in selecting the proportions of the components of the first body than in selecting the proportions of the components of the second body.

Also, according to the invention, if it is desired to produce ceramic products for different uses, it is possible to use exactly the same components for first bodies (for lower layers) and exactly the same proportions thereof and it is only necessary to select different components other than a plastic ceramic raw material and a fusible material for second bodies (for upper layers) if other components are required and to select the proportions of the second bodies.

If a conventional ceramic product containing sludge ashes is washed with rainwater, the rainwater soaks into the product with the result that the salt contained in the sludge ashes in particular dissolves in the rainwater, and after the rain has stopped, the solution moves onto the surface of the product and recrystallizes thereon while the product is being dried. However, thanks to the presence of the upper layer, the ceramic product produced according to the invention does not present such a phenomenon.

Also, if the ceramic product hereof is coated with a vitreous glaze on its surface, its surface is not easily polluted.

In addition, the ceramic product hereof appears to be porcelain, natural soil or natural stone. In this respect the ceramic product hereof is distinguished from competing products.

Examples of the process of the invention will now be described.

EXAMPLE 1

A small amount of water was added to components of Table 1-1, and the whole was mixed together while agitating it at a rapid rate and was granulated. Then, the grains thus obtained were allowed to dry until the moisture content of the grains was reduced to a suitable percentage for a molding operation, namely 10 percent. Then, the grains were percolated through a 10-mesh screen to prepare a first body.

Then, a small amount of water was added to components of Table 1-2, and the whole was mixed together while agitating it and was granulated. The grains thus obtained were allowed to dry until the moisture content of the grains was reduced to 10 percent. Then, the grains were percolated through a 10-mesh screen to prepare a second body. The second body was prepared in a smaller amount than the first body.

The first body was supplied into the matrix of a hydraulic brick molding machine such that the first body filled approximately five sixths of the whole space in the matrix. Then, the second body was supplied into the matrix of the molding machine such that the second body filled the remaining space in the matrix. Then, the whole body in the matrix was molded under a pressure of 200 kg/cm$^2$ into an object with dimensions of 200 mm $\times$ 100 mm $\times$ 60 mm.

The foregoing process was repeated a number of times to provide a number of same moldings.

Then, each molding was fired for 40 hours through a tunnel kiln maintained at a temperature of 1,100° C.

As a result, first ceramic products with characteristics of Table 1-3 were produced.

Additional moldings were produced in the same manner as described above. Also, a mixture of components of Table 1-4 was ground in a ball mill while adding water to the mixture, so that a slurry, or glaze with a concentration of 50 percent was prepared. The glaze was sprayed on the surface of each additional molding in an amount of 3 grams. Then, each additional molding was fired for 40 hours through a tunnel kiln maintained at a temperature of 1,100° C. As a result, second ceramic products with much the same characteristics as the first ceramic products were produced. However, the second ceramic products had greater wear resistances and greater surface hardnesses than the first ceramic products. Also, the surfaces of the second ceramic products were not easily polluted in comparison with the surfaces of the first ceramic products. In addition, the second ceramic products appeared to be porcelains and, hence, to be high-grade articles more than the first ceramic products.

Neither of the first and second ceramic products presented the previously-mentioned phenomenon presented by a conventional ceramic product containing sludge ashes if the conventional ceramic product is washed with rainwater.

As seen from Table 1-3, both the first and second ceramic products were suitable for use as water-permeable materials for paving exclusive pedestrian roads. However, as seen from the foregoing, the second ceramic products were more suitable for such a use than the first ceramic products.

TABLE 1-1

| Components | Parts by weight | Remarks |
| --- | --- | --- |
| Sludge ashes | 40 | Fine ashes with a moisture content of 20% |
| Water-granulated aggregate | 25 | Dried, crushed and passed through a 10-mesh screen |
| River sand | 20 | Dried, crushed and passed through a 10-mesh screen |
| Waste wall tile | 10 | Dried, crushed and passed through a 10-mesh screen |
| Gairome clay | 5 | With a moisture content of 30% |

TABLE 1-2

| Components | Parts by weight | Remarks |
| --- | --- | --- |
| Sludge discharged from a factory | 25 | With a moisture content of 30% |
| Water-granulated aggregate | 20 | Dried, crushed and passed through a 10-mesh screen |
| River sand | 30 | Dried, crushed and passed through a 10-mesh screen |
| Waste wall tile | 15 | Dried, crushed and passed through a 10-mesh screen |
| Gairome clay | 10 | With a moisture content of 30% |
| Pigment of a green color | 3 | Dried, fine powdery pigment |

TABLE 1-3

| Characteristics | Values of Characteristics |
| --- | --- |
| Surface color | Green color |
| Bending strength | 30 kgf/cm$^2$ (based on JIS R2213) |
| Compressive strength | 100 kgf/cm$^2$ |
| Wear resistance | 0.02 gram (based on JIS A5209) [by sanding] |
| Surface hardness | Mohs hardness of 6 to 7 |
| Skid resistance | 0.9 (based on JIS A1407) |
| Bulk specific gravity | 1.60 |
| Coefficient of water permeability | $5 \times 10^{-2}$ cm/sec. |

TABLE 1-4

| Components | Parts by weight | Remarks |
| --- | --- | --- |
| Leadless frit with a low melting | 50 | Frit like glass flakes which contains K$_2$O Na$_2$O, CaO, MgO, Al$_2$O$_3$, B$_2$O$_3$, SiO$_2$ and the like |
| Kamado feldspar | 25 | Powder of feldspar usually used for the production of ceramic products |
| Barium carbonate | 5 | Very fine powder of barium carbonate usually used for the production of ceramic products |
| Korean kaolin | 20 | Powder of Korean kaolin usually used for the production of ceramic products |

EXAMPLE 2

Components of Table 2-1 were mixed and kneaded together while agitating the components at a rapid rate. The mixture thus obtained was allowed to dry until the moisture content of the mixture was reduced to a suitable percentage for a molding operation, namely 15 percent. Then, the mixture was reduced to powder. The powder thus obtained was percolated through a 10-mesh screen to prepare a first body.

Then, components of Table 2-2 were mixed and kneaded together while agitating the components at a rapid rate. The mixture thus obtained was allowed to dry until the moisture content of the mixture was reduced to 10 percent. Then, the mixture was reduced to powder. The powder thus obtained was percolated through a 10-mesh screen to prepare a second body. The second body was prepared in a smaller amount than the first body.

The first body was supplied into the matrix of a hydraulic brick molding machine such that the first body filled approximately five sixths of the whole space in the matrix. Then, the second body was supplied into the matrix of the molding machine such that the second body filled the remaining space in the matrix. Then, the whole body in the matrix was molded under a pressure of 300 kg/cm$^2$ into an object with dimensions of 200 mm $\times$ 100 mm $\times$ 60 mm.

The foregoing process was repeated a number of times to provide a number of same moldings.

Then, each molding was fired for 40 hours through a tunnel kiln maintained at a temperature of 1,100° C.

As a result, ceramic products with characteristics of Table 2-3 were produced. The characteristics of Table 2-3 show that the ceramic products are suitable for use as materials for paving roads to be shared by pedestrians and vehicles.

TABLE 2-1

| Components | Parts by weight | Remarks |
| --- | --- | --- |
| Sludge ashes | 40 | Fine ashes with a moisture content of 20% |
| River sand | 10 | Dried, crushed and passed through a 10-mesh screen |
| Waste wall tile | 10 | Dried, crushed and passed through a 10-mesh screen |
| Gairome clay | 40 | With a moisture content of 30% |

TABLE 2-2

| Components | Parts by weight | Remarks |
| --- | --- | --- |
| Sludge discharged from a factory | 30 | With a moisture content of 30% |
| River sand | 10 | Dried, crushed and passed through a 10-mesh screen |
| Waste wall tile | 15 | Dried, crushed and passed through a 10-mesh screen |
| Gairome clay | 45 | With a moisture content of 30% |
| Pigment of a green color | 3 | Dried, fine powdery pigment |

TABLE 2-3

| Characteristics | Values of Characteristics |
| --- | --- |
| Surface color | Green color |
| Bending strength | 100 kgf/cm$^2$ (based on JIS R2213) |
| Compressive strength | 450 kgf/cm$^2$ |

TABLE 2-3-continued

| Characteristics | Values of Characteristics |
|---|---|
| Wear resistance | 0.01 gram (based on JIS A5209) [by sanding] |
| Surface hardness | Mohs hardness of 7 to 8 |
| Skid resistance | 0.8 (based on JIS A1407) |
| Bulk specific gravity | 1.95 |
| Water absorption | 5% (based on JIS A5209) |

EXAMPLE 3

A mixture of components of Table 3-1 was ground in a ball mill while adding water and a deflocculant to the mixture, so that a slurry with a concentration of 50 percent was prepared. The slurry was dehydrated with a filter press to provide a body cake. Then, the body cake was allowed to dry until the moisture content of the body cake was reduced to a suitable percentage for a molding operation, namely 10 percent. The body cake was reduced to powder. The powder obtained was percolated through a 10-mesh screen to prepare a first body.

Then, a mixture of components of Table 3-2 was ground in the ball mill while adding water and a deflocculant to the mixture, so that a slurry with a concentration of 60 percent was prepared. The slurry was dehydrated with a filter press to provide a body cake. Then, the body cake was allowed to dry until the moisture content of the body cake was reduced to 7 percent. The body cake was reduced to powder. The powder obtained was percolated through a 10-mesh screen to prepare a second body. The second body was prepared in a smaller amount than the first body.

The first body was supplied into the matrix of a hydraulic tile molding machine such that the first body filled approximately two thirds of the whole space in the matrix. Then, the second body was supplied into the matrix of the molding machine such that the second body filled the remaining space in the matrix. Then, the whole body in the matrix was molded under a pressure of 300 kg/cm² into an object with dimensions of 200 mm × 200 mm × 20 mm.

The foregoing process was repeated a number of times to provide a number of same moldings.

Then, each molding was fired for 40 hours through a tunnel kiln maintained at a temperature of 1,100° C.

As a result, ceramic products with characteristics of Table 3-3 were obtained. The characteristics of Table 3-3 show that the ceramic products are suitable for use as unglazed tiles for exterior finish of buildings or as unglazed floor tiles.

TABLE 3-1

| Components | Parts by weight | Remarks |
|---|---|---|
| Sludge ashes | 60 | Fine ashes with a moisture content of 20% |
| Kamodo feldspar | 10 | Dried, crushed and passed through a 10-mesh screen |
| Waste wall tile | 10 | Dried, crushed and passed through a 10-mesh screen |
| Gairome clay | 20 | With a moisture content of 30% |

TABLE 3-2

| Components | Parts by weight | Remarks |
|---|---|---|
| Sludge discharged from a factory | 35 | With a moisture content of 30% |
| Kamado feldspar | 15 | Dried, crushed and passed through a 10-mesh screen |
| Waste wall tile | 20 | Dried, crushed and passed through a 10-mesh screen |
| Gairome clay | 30 | With a moisture content of 30% |
| Pigment of a beige color | 3 | Dried, fine powdery pigment |

TABLE 3-3

| Characteristics | Values of Characteristics |
|---|---|
| Surface color | Beige color |
| Bending strength | 350 kgf/cm² (based on JIS R2213) |
| Wear resistance | Less than 0.01 gram (based on JIS A5209) [by sanding] |
| Surface hardness | Mohs hardness of 7 to 8 |
| Skid resistance | 0.6 (based on JIS A1407) |
| Water absorption | less than 1% (based on JIS A5209) |

What is claimed is:

1. A process for producing a ceramic product using sludge ashes, comprising the steps of
    (a) mixing at least (i) ashes obtained by burning a sludge which as been obtained by the treatment of sewage and (ii) a plastic ceramic raw material to prepare a first body,
    (b) mixing at least a plastic ceramic raw material and a fusible material to prepare a second body,
    (c) supplying the first and second bodies into a matrix of a molding machine such that the first and second bodies form a lower, major layer and an upper, surface layer which covers the lower layer, respectively,
    (d) molding the first and second bodies as one body into an object with a desired shape, and
    (e) firing a molding obtained in the step (d), thereby producing a two-layer ceramic product whereby the effects of different sewage treatments on the quality of the resultant product is largely mitigated.

2. A process in accordance with claim 1 wherein in the step (b) the plastic ceramic raw material, the fusible material and a pigment of a desired color are mixed together to produce a ceramic product with a surface of the desired color.

* * * * *